(12) United States Patent
Timbus et al.

(10) Patent No.: US 10,161,386 B2
(45) Date of Patent: Dec. 25, 2018

(54) OPTIMAL WIND FARM OPERATION

(71) Applicant: ABB Schweiz AG, Baden (CH)

(72) Inventors: Adrian Timbus, Dättwil (CH); Carsten Franke, Stetten (CH); Marija Zima, Zürich (CH)

(73) Assignee: ABB Schweiz AG, Baden (CH)

( * ) Notice: Subject to any disclaimer, the term of this patent is extended or adjusted under 35 U.S.C. 154(b) by 10 days.

(21) Appl. No.: 15/375,904

(22) Filed: Dec. 12, 2016

(65) Prior Publication Data

US 2017/0089325 A1     Mar. 30, 2017

Related U.S. Application Data

(63) Continuation of application No. PCT/EP2015/061734, filed on May 27, 2015.

(30) Foreign Application Priority Data

Jun. 10, 2014    (EP) .................................... 14171827

(51) Int. Cl.
*F03D 7/04*     (2006.01)
*F03D 7/02*     (2006.01)
(Continued)

(52) U.S. Cl.
CPC ........... *F03D 7/048* (2013.01); *F03D 7/0292* (2013.01); *F03D 7/043* (2013.01); *F03D 7/045* (2013.01);
(Continued)

(58) Field of Classification Search
None
See application file for complete search history.

(56) References Cited

U.S. PATENT DOCUMENTS

| 8,633,607 B2 | 1/2014 | Egedal et al. |
| 8,649,911 B2 | 2/2014 | Avagliano et al. |

(Continued)

FOREIGN PATENT DOCUMENTS

| CN | 103259262 A | 8/2013 |
| EP | 1790851 A2 | 5/2007 |

(Continued)

OTHER PUBLICATIONS

European Patent Office, International Search Report & Written Opinion issued in corresponding Application No. PCT/EP2015/061734, dated Jan. 29, 2016, 10 pp.

(Continued)

*Primary Examiner* — Jason Lin
(74) *Attorney, Agent, or Firm* — J. Bruce Schelkopf; Taft Stettinius & Hollister LLP

(57) ABSTRACT

The present application is concerned with a flexible way of operating a wind farm with a plurality of degrading wind turbine components. According to the invention, maintenance scheduling and power production in the wind farm are handled concurrently in a single optimization step. Instead of a serial approach first scheduling maintenance activities and subsequently adapting the power production and/or wind turbine operation the two aspects are optimized together. The wind farm operation takes maintenance aspects into account by adapting life index or health status based on modeled mechanical and electrical stress. Accordingly, the wind farm owner may decide when and how much energy to produce accepting which level of stress to the turbine equipment. The proposed optimization of wind farm operation includes all aspects of transmission network operator settings, the topology of wind farms and the underlying collector grid, the short and long term wind conditions forecasts, the conditions of the turbines, the estimated (Continued)

remaining operational time under different usage patterns and times, as well as aspects of the electricity market.

17 Claims, 1 Drawing Sheet

(51) Int. Cl.
    *F03D 80/50* (2016.01)
    *G05B 13/02* (2006.01)
    *G05B 19/048* (2006.01)
    *G05B 23/02* (2006.01)
    *G05F 1/66* (2006.01)
    *F03D 9/25* (2016.01)

(52) U.S. Cl.
    CPC ............. *F03D 9/257* (2017.02); *F03D 80/50* (2016.05); *G05B 13/026* (2013.01); *G05B 19/048* (2013.01); *G05B 23/0283* (2013.01); *G05F 1/66* (2013.01); *F05B 2270/20* (2013.01); *F05B 2270/332* (2013.01); *F05B 2270/404* (2013.01); *G05B 2219/24001* (2013.01); *G05B 2219/2619* (2013.01); *Y02E 10/723* (2013.01)

(56) References Cited

U.S. PATENT DOCUMENTS

| | | |
|---|---|---|
| 2006/0273595 A1 | 12/2006 | Avagliano et al. |
| 2008/0086281 A1 | 4/2008 | Santos |
| 2010/0292856 A1* | 11/2010 | Fujita ................... G06Q 10/04 700/291 |
| 2011/0040550 A1* | 2/2011 | Graber ................... G06Q 10/06 703/18 |
| 2013/0035798 A1* | 2/2013 | Zhou ..................... F03D 7/0292 700/287 |
| 2013/0073223 A1* | 3/2013 | Lapira ..................... G06F 19/00 702/34 |
| 2013/0166082 A1* | 6/2013 | Ambekar ............... G05B 13/04 700/287 |
| 2013/0214534 A1* | 8/2013 | Nakamura ................ F03D 7/00 290/44 |
| 2014/0031998 A1* | 1/2014 | Mukherjee ................ H02J 3/28 700/291 |
| 2014/0328678 A1* | 11/2014 | Guadayol Roig .... F03D 7/0292 416/1 |
| 2015/0176569 A1* | 6/2015 | Karikomi .............. G01M 15/14 702/34 |

FOREIGN PATENT DOCUMENTS

| | | |
|---|---|---|
| EP | 2582975 B1 | 8/2015 |
| WO | 2011095519 A2 | 8/2011 |
| WO | 2011160634 A1 | 12/2011 |
| WO | 2013044925 A1 | 4/2013 |
| WO | 2013083138 A1 | 6/2013 |

OTHER PUBLICATIONS

European Patent Office, Search Report issued in corresponding Application No. 14171827.0, dated Sep. 24, 2014, 5 pp.
Kusiak et al., "Anticipatory Control of Wind Turbines with Data-Driven Predictive Models," IEEE Transactions on Energy Conversion, vol. 24, No. 3, Sep. 2009, pp. 766-774.

* cited by examiner

OPTIMAL WIND FARM OPERATION

FIELD OF THE INVENTION

The invention relates to the field of wind farm operation. Specifically, it relates to a wind farm connected to an electrical power transmission grid and including a plurality of wind turbines with turbine components subject to degradation.

BACKGROUND OF THE INVENTION

The recent increase in wind power generation is likely to continue thereby raising the level of renewable energy production to unprecedented heights. A significant amount of the forthcoming wind power generation capacity is going to be off-shore, which gives rise to specific electrical connectivity considerations and component maintenance issues. As a matter of fact, operational costs of wind farms after installation are mainly driven by maintenance, with off-shore wind farms being about fifty percent more expensive than on-shore installations. This is mainly caused by increasing dependencies on weather conditions and the additional limiting factor of very special ships capable of navigating between the turbines and transporting the components that must be exchanged.

Conventionally, wind farm maintenance events are planned in distinct time steps, starting with a multi-year plan indicating that a certain percentage of the overall equipment will be exchanged per year. This results in an initial schedule that is refined and adapted over time, based on repeatedly re-evaluated equipment characteristics. On the other hand, wind farm production planning is conventionally performed on a quite distinct time-scale, in particular on a weekly and daily basis. That is, the electricity generation planning considers the previously established maintenance events only as unchallengeable constraints.

According to the patent application WO 2013044925, in order to ensure that the fatigue load limits of all wind turbine components remain within their design lifetimes, the loads experienced by a component such as bending moments, temperatures, forces or motions may be measured and the amount of component fatigue life consumed, or of complementary residual lifetime, calculated. This calculation is done for example using a well-known technique such as a rain-flow counting algorithm and Miner's rule or a chemical decay equation. Temporary over-rating may be prohibited if a given turbine component is above its target fatigue life and is sensitive to the parameter being over-rated.

The U.S. Pat. No. 8,649,911 B2 discloses assessing a plurality of sensed (electrical, mechanical, thermal, meteorological) operating parameters with respect to respective design ratings for the operating parameters (speed limits, torque limits). This includes estimating fatigue in real time based on wind history, and may result in uprating a power set point of the wind turbine when the assessment indicates that a sensed wind turbulence is lower than the estimated wind turbulence.

The U.S. Pat. No. 8,633,607 B2 discloses a method for controlling a wind farm with a plurality of wind turbines, wherein a required power is distributed among the wind turbines based on fatigue load versus power curves of single wind turbines. Determining a fatigue load versus power curve may comprise measuring wind turbine parameters (vibrations, static load). A fatigue load versus power curve may exhibit a maximum, with the fatigue load decreasing again beyond a certain power setting, which potentially favors unsymmetrical operation of wind turbines in order to reduce an average fatigue load in the wind farm.

All the above prior art approaches have in common that wind turbine operation is controlled in order to adapt to, or comply with, present or updated requirements derived from turbine component design lifetimes, and in order to avoid exceeding a design or target fatigue load for an extended period of time. Again, previously established maintenance events are considered as unchallengeable constraints.

The patent application US 20130214534 discloses a wind farm operation control system for estimating a remaining lifetime or deterioration state of a wind turbine component; estimating an income from sales of electric power under a plurality of power limit conditions equal to one of 80%, 90%, 100% of rated power; estimating maintenance cost for each of a plurality of candidate timings of performing maintenance on the component, based on the remaining lifetime of the component under each of the plurality of power limit conditions; and selecting a power limit condition that maximizes income obtained from the wind farm. The power limit conditions introduced do represent plant-wide uniform and time-invariant decision variables.

DESCRIPTION OF THE INVENTION

It is an objective of the invention to increase flexibility in operating a wind farm. This objective is achieved by a method and a system according to the independent claims. Preferred embodiments are evident from the dependent patent claims.

According to the invention, maintenance scheduling and power production in wind farms are handled concurrently in a single optimization step. Instead of a serial approach first scheduling maintenance activities and subsequently adapting the power production or wind turbine operation the two aspects are optimized together. Wind farm operation takes maintenance aspects into account by adapting a life index or health status based on modeled mechanical and electrical stress. Accordingly, the wind farm owner may decide when and how much energy to produce thus accepting a certain level of stress to the turbine equipment. The proposed optimization of wind farm operation may include aspects related to transmission network operator settings, topology of wind farms and the underlying collector grid, short and long term wind conditions forecasts, conditions of the turbines, estimated remaining operational time under different usage patterns and times, as well as aspects of the electricity market. Throughout this specification, the term wind farm refers to an ensemble of wind turbines all connected to the transmission network via a substation or point of common coupling, irrespective of whether the wind turbines are in turn grouped or arranged in distinguishable smaller units.

Specifically, a method of operating a wind farm including a plurality of wind turbines with turbine components subject to degradation comprises the following steps:

Predicting, for a turbine component of a first wind turbine and for each time interval or time step of a sequence of time intervals into the future, based on a sequence or trajectory of time interval-dependent first turbine control input values $u_1(t_1) \ldots u_1(t_{N1})$ including a component maintenance action initiated or commencing at a maintenance interval $t_{M1}$, and based on a model of the first wind turbine, a component life index $L(t)$, or a simulated lifetime trajectory value indicative of a consumed or remaining life of the component;

Determining a sequence of optimum turbine control input values $u_1^*(t_1) \ldots u_1^*(t_{N1})$ including an optimum maintenance interval $t_{M1}^*$ that optimize a value of an objective function J(u) depending on the component life index L and optionally on other forecast trajectories;

Providing a first optimum turbine control input value $u_1^*(t_1)$ to a wind turbine control module of the first wind turbine, and operating the first wind turbine accordingly at the first time step or during the first time interval.

In the present context, turbine control input values include one or more of a pitch angle, yaw angle, nacelle direction, blade settings, rotation speed of the turbine, and set-points for active P or reactive Q power of a wind turbine. Deriving or calculating, in the forecast step, the component life index from the turbine control inputs involves techniques explicitly known in the art as well as any other suitable way of relating component wear or lifetime to wind turbine operation.

In a preferred variant of the invention, the component life index of the turbine component depends on operational behaviour of a second wind turbine generally located upstream of the first turbine, more specifically on a plurality of further wind turbines and a corresponding trajectory of multi-turbine input values. The method of operating a wind farm then comprises the step of predicting the component life index based on a sequence of second turbine control input values $u_2(t_1) \ldots u_2(t_{N2})$ of the second wind turbine by evaluating wind turbulence or wake effects at the first turbine. The latter are predicted, or modelled, based on the operation of the second wind turbine which in turn is determined by the second turbine control inputs. The method also includes the step of determining concurrently optimum first and second turbine control input values $u_1^*(t_1) \ldots u_1^*(t_{N1}), u_2^*(t_1) \ldots u_2^*(t_{N1})$ to be provided to the respective wind turbine control modules.

In another preferred variant of the invention, the component life index of the turbine component of the first wind turbine depends on an operational behaviour of a second wind turbine electrically connected to a same branch of a collector grid of the wind farm as the first wind turbine. The method of operating a wind farm then comprises the step of predicting the component life index of the component based on a sequence of second turbine control input values $(u_2(t_1) \ldots u_2(t_{N2}))$ of the second wind turbine, by evaluating electrical interaction between a generator of the first turbine and a generator of the second turbine. Such interaction may be based on a voltage phase and amplitude difference between the branch side of the two generators, which in turn is a consequence of different P, Q set points for the two wind turbines. The method also includes the step of determining concurrently optimum first and second turbine control input values $u_1^*(t_1) \ldots u_1^*(t_{N1}), u_2^*(t_1) \ldots u_2^*(t_{N2})$ to be provided to the respective wind turbine control modules.

In another preferred variant of the invention, the objective function J is extended to the handling of plural degrading turbine components and facilitates distinct maintenance time intervals $t_{Mj}^*$ for each component. The method of operating a wind farm then comprises the steps of determining optimum turbine control input values $u^*(t)$ including optimum maintenance intervals $t_{Mj}^*$ optimizing an objective function J(u) that depends on plural component life indices $L_j$ each assigned to one of the plural components. Optimizing a value of the objective function as a function of turbine control input values for each of the plurality of time intervals of the prediction period comprises iteratively varying a trajectory of candidate turbine control input values including candidate maintenance time intervals $t_{Mj}$ until an optimised value of the objective function J(u) is arrived at. For each component, such optimum is expected to correlate with a low or even minimal residual value of the life index $L_j$ at the corresponding maintenance time interval $t_{Mj}^*$.

According to an advantageous embodiment of the invention, optimization of the objective function includes minimizing a difference between a forecast demand power of the wind farm and a forecast generated power of the plurality of wind turbines of the wind farm, evaluated either at a specific time interval or as an integral over plural time intervals. The method of operating the wind farm includes the steps of Providing, or predicting, for each time interval of the sequence of time intervals into the future a wind forecast including wind speed and wind direction at each of the plural of wind turbines, and calculating, for each of the sequence of time intervals into the future, a sequence of electrical power output values $(p_j(t_1) \ldots p_j(t_{Nj}))$ of each turbine based on the wind forecast and based on the sequence of turbine control input values $u_j(t_1) \ldots u_j(t_{Nj})$;

Providing, or predicting, for each of the sequence of time intervals into the future an electrical power demand or power generation forecast for the wind farm, with a power generation forecast, or bid, being indicative of a power the wind farm operator is offering to produce, and being less than a power demand forecast issued by a network operator;

Providing an objective function that penalizes a deviation of the calculated power output of all turbines of the farm from the predicted power demand or power supply, and therefore minimizing such difference. Accordingly, a time interval with a consolidated wind power capacity of the farm exceeding the electrical power demand or power supply is likely to be identified for executing maintenance of the component, thus avoiding any unintended loss in power output of the wind farm.

According to another advantageous embodiment of the invention, an update frequency or a time delay between successive determinations of the sequence of optimum turbine control input values $u_1^*(t_1) \ldots u_1^*(t_{N1})$ may depend on a wind speed, a wind speed variability, or a forecast data update frequency. Hence the control input value update may be executed at least once per hour, preferably at least every fifteen minutes, more preferably at least once per minute.

According to another advantageous embodiment of the invention, optimization of the objective function includes minimizing a power flow imbalance in a current collector grid interconnecting the wind turbines of the wind farm, evaluated either at a specific time interval or as an integral over plural time intervals. The objective function penalizes power flow imbalance in the collector grid, and/or favours a more balanced collector grid power flow ultimately reducing electrical losses. A more homogeneous power flow distribution likewise avoids electrical interaction through the collector grid and/or collector grid instabilities such as voltage variations at nominal frequencies or current harmonics at higher frequencies. Accordingly, an even distribution of the turbines being serviced at a time among the branches of the collector grid will be favoured.

According to another advantageous embodiment of the invention, optimization of the objective function includes maximizing earnings or revenues, and/or minimizing cost. The objective function in this case includes a term indicative of earnings from electrical power generated by the first turbine over the prediction period or sequence of time intervals into the future.

In summary, wind farm management according to the invention optimizes the wind farm power production planning and operation including above considerations with an aim to minimize maintenance impact and maximize power production, under consideration of the turbine health status, and possible interactions between turbines. Wind farm management may include long term wind forecasts and energy price forecasts when deciding about power generation over a long term horizon, ultimately determining in this way a combined production and maintenance schedule for the entire wind farm.

BRIEF DESCRIPTION OF THE DRAWINGS

The subject matter of the invention will be explained in more detail in the following text with reference to preferred exemplary embodiments which are illustrated in the attached drawings, in which.

DETAILED DESCRIPTION OF PREFERRED EMBODIMENTS

Figure 1:
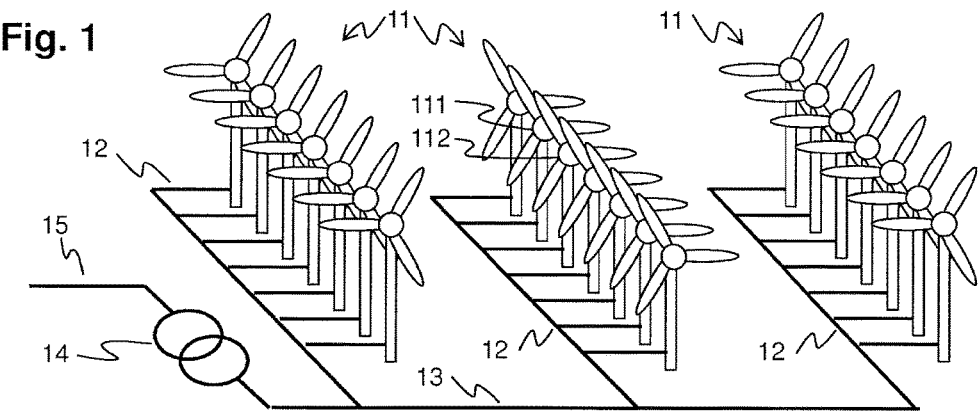
FIG. 1 schematically shows a wind farm layout.

FIG. 1 depicts a wind farm layout with three parallel rows 11 each comprising seven wind turbines connected to a branch 12 of a collector grid. Exemplary first and second wind turbines are denoted 111 and 112. All collector grid branches converge at a Medium Voltage MV bus bar 13 of a main substation. A transformer 14 connects the MV bus bar to a Point of Common Coupling PCC and further to a transmission grid 15 under control of a grid or network operator.

Figure 2:
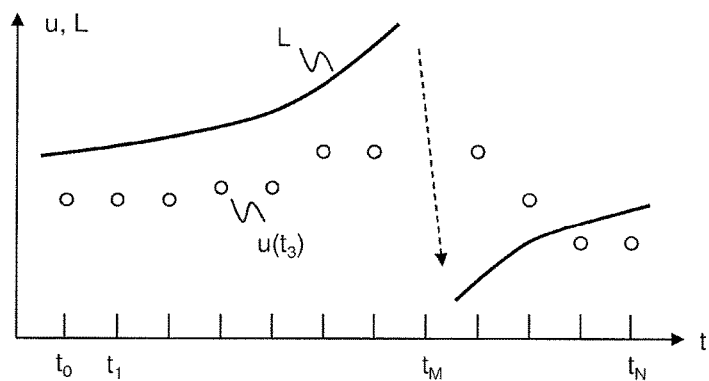
FIG. 2 depicts turbine control input values and corresponding life index evolution.

FIG. 2 is a graph showing, at distinct time steps beginning with $t_0$ and ending at $t_N$, turbine control input values u(t) (small circles) as well as an interpolated component life index evolution L(t) or lifetime trajectory. The latter is, in this representation, indicative of a consumed lifetime or inverse health condition of the turbine component. Starting from a base index value at present time to the index increases steadily in relation to the values of the turbine control input. The life index is re-set to a lower value at a maintenance time step $t_M$.

Figure 3:
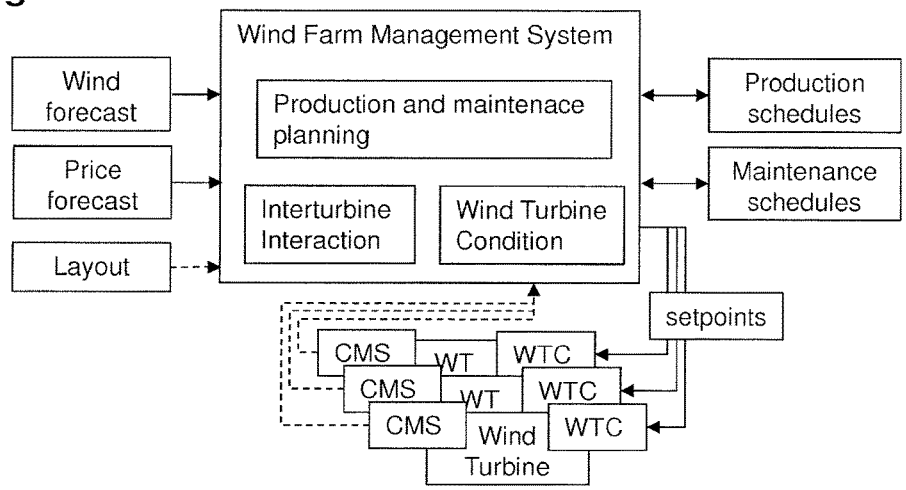
FIG. 3 depicts various aspects of a wind farm control concept.

FIG. 3 depicts various aspects of a wind farm control concept. The wind farm has a certain wind farm layout specifying an electrical collector grid topology and a mutual geographical arrangement of the individual wind turbines. The latter allows to account for wind turbulences, or wake effects, between different wind turbines in the wind farm management system. Three wind turbine instances are depicted, each provided with a Wind Turbine Control WTC module and an optional Condition Monitoring System CMS including sensors and diagnostics tools to determine a life index or health condition of the turbine.

The wind farm management system receives measurement data from the wind farm including the data from the CMS and the current wind conditions. Additionally, the wind farm management system receives the current network operator dispatch points specifying the operation mode of the wind farm and the associated operating points on a farm level.

The wind farm management system receives short, mid and long term wind forecasts for wind power prediction as well as short, mid and long term energy price forecasts. Both information can be provided by external services or by the wind farm operator. Likewise, demand or load forecasts, possibly in the form of repeating seasonal patterns, may be provided to the system. Here, seasonal patterns can be envisioned that specify periods where energy demand is high and periods were it is likely to have low demands from the grid perspective. Furthermore, external tools or services are used to predict the long term network operator dispatch points, wherein energy demands may also be modelled within such long term forecast of the network operator dispatch points.

The wind farm management system includes a wind turbine condition module for determining a life index indicative of a health condition, or lifetime consumption, or aggregated wear, of each wind turbine, or even of individual components thereof. Typical components considered include blades, converter, generator, and transformer of the turbine. An updated life index indicative of a present component status may be obtained from the CMS and/or determined from corresponding sensor data.

Alternatively, a life index may be determined or predicted based on recorded or forecast hours of operation of the turbine components and/or corresponding operating conditions or turbine control inputs. Turbine operation gives rise to a mechanical stress for the components of wind turbine to which adds an electrical stress mainly caused by the currents carried by electrical components of the turbine. At least two ways of determining, linking, a life index to the operating hours and/or turbine control inputs may be considered:
a) The operating hours and/or turbine control inputs may be mapped to, or compared with, an expected life index provided by the component manufacturer and based on design operating parameters.
b) The operating hours and/or turbine control inputs may be fed into models of the turbine components to identify the deterioration rate and hence the life index of the component. The models may include empirical models of the turbine components that are trained on observed deterioration data of turbines of an at least similar kind than the turbine under consideration. Turbine model training, or model calibration, also includes suitable evaluation of observed premature turbine failures.

Determining a life index or forecasting a lifetime trajectory of a turbine component may include one of crack growth or creep models of thick-walled components such as turbine blades subject to mechanical stress, fatigue estimation in the blades related to start ups and shut downs, turbine converter power electronics failure estimation, e.g. of power semiconductor switching elements such as IGBTs, related to high load such as speed, torque, power operation and/or large number of switching events, wear estimation, e.g. of coal brushes, slip ring, motor bearings, gearbox, related to number of rotations of the turbine.

The wind farm management system includes an inter-turbine interaction module for evaluating aerodynamic and electrical or electro/mechanical interactions between individual wind turbines of a wind farm. In a simplified picture, if an upstream turbine creates wakes, a downstream turbine experiences more turbulent conditions and corresponding mechanical vibrations. The inter-turbine interaction may be quantified as a function of the operational points the individual turbines. Accordingly, by suitably balancing the operational points of neighboring turbines, the mechanical load can in some cases be transferred or migrated from one turbine to another.

The wind farm management system ultimately may include a production and maintenance planning module for determining production and maintenance schedules and for issuing corresponding turbine control inputs including setpoints for active or reactive power to the individual wind turbine control modules. The maintenance planning module is aware of possible maintenance intervals and constraints, i.e. the number of turbines may be serviced in a given maintenance interval.

The inclusion, in an objective function, of a life index allows to influence an availability of a wind turbine component through controlled ageing or lifetime engineering, by prediction of component degradation based on turbine control inputs. Specifically, a method of operating a wind farm including a plurality of wind turbines with turbine components subject to degradation may comprise the steps of a) determining a trajectory of candidate turbine control input values $u(t_i)$ at N future time steps or intervals $t_1 \ldots t_N$, including values of active/reactive power generated P, Q, and/or set points for pitch angles, yaw angles, generator/rotor speed, and including a maintenance time $t_M$, b) determining, by means of wind turbine Model Predictive Control MPC, from the trajectory of turbine control input values u(t) a simulated lifetime trajectory L(t) of a first turbine component, c) computing an objective function J(u) comprising, inter alea, the simulated lifetime trajectory L(t), d) iteratively repeating steps a) through c) with an optimisation module varying the trajectory of turbine control input values u(t) until an optimised value of the objective function J[u] is obtained for a trajectory of optimum turbine control input values u*(t) including an optimum maintenance time $t_M^*$, e) applying to the turbine at least a first optimum turbine control input value $u^*(t_1)$ of the trajectory of optimum turbine control input values.

The method may also comprise, wherein an operational behaviour of a second wind turbine is predicted from a trajectory of multi-turbine input values, determining the simulated lifetime trajectory for the component by predicting and evaluating wind turbulence or wake effects from the operational behaviour of the second wind turbine on the first turbine.

The features of the method of operating a wind farm and the wind farm controller as described herein may be performed by way of hardware components, firmware, and/or a computing device having processing means programmed by appropriate software. For instance, the wind farm controller can include any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor can be programmed or configured to include and perform features of the exemplary embodiments of the present disclosure such as a method of operating a wind farm. The features can be performed through program or software code encoded or recorded on the processor, or stored in a non-volatile memory accessible to the processor, such as Read-Only Memory (ROM), erasable programmable read-only memory (EPROM), or other suitable memory or circuit as desired. In another exemplary embodiment, the program or software code can be provided in a computer program product having a non-transitory computer readable recording medium such as a hard disk drive, optical disk drive, solid state drive, or other suitable memory device or circuit as desired, the program or software code being transferable or downloadable to the processor for execution when the non-transitory computer readable medium is placed in communicable contact with the processor.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of operating a wind farm including plurality of wind turbines with a plurality of turbine components comprising a first and further turbine components, said plurality of turbine components subject to degradation, comprising:

predicting, for a turbine component of a first wind turbine and for each of a sequence of time intervals $(t_1 \ldots t_{N1})$ into the future, based on a sequence of first turbine control input values $(u_1(t_1) \ldots u1(t_{N1}))$ including a component maintenance action at a maintenance interval tM1, a component life index L(t) of the first turbine component, determining a sequence of optimum turbine control input values $(u_1^*(t_1) \ldots u_1^*(t_{N1}))$ including a) an optimum maintenance interval $t_{Mi}^*$ for the first turbine component and b) optimum maintenance intervals $t_{Mj}^*$ for each of the further turbine components that optimize an objective function J(u) depending on the component life index L of the first turbine component and on component life indices $L_j$ of the further turbine components, and operating the first wind turbine according to at least one optimum turbine control input value $u_1^*(t_1)$, wherein the method further comprises predicting the component life index of the component based on a sequence of second turbine control input values $(u_2(t_1) \ldots u_2(t_{N2}))$ of a second wind turbine electrically connected to a same branch of a collector grid of the wind farm as the first wind turbine, by evaluating voltage phase and amplitude difference between the first turbine and the second turbine, and determining optimum first and second turbine control input values $u_1^*(t)$, $u_2^*(t)$.

2. The method of claim 1, comprising predicting the component life index of the component based on the sequence of second turbine control input values $(u_2(t_1) \ldots u_2(t_{N2}))$ of the second wind turbine located upstream of the first wind turbine by evaluating predicted wind turbulences at the first turbine and caused by operational behavior of the second wind turbine, and determining optimum first and second turbine control input values $u_1^*(t)$, $u_2^*(t)$.

3. The method of claim 2, comprising providing for each of the sequence of time intervals $(t_1 \ldots t_{Nj})$ into the future a wind forecast, and calculating a sequence of electrical power output values $(p_j(t_1) \ldots p_j(t_{Nj}))$ of each of the plurality of turbines of the wind farm based on the wind forecast and based on a respective sequence of turbine control input values $(u_j(t_1) \ldots u_j(t_{Nj}))$, providing for each of the sequence of time intervals ($t_1 \ldots t_{Nj}$) into the future an electrical power demand or power generation forecast P(t) for the wind farm, and providing an objective function J penalizing a deviation of a sum of the calculated electrical power outputs $p_j(t)$ of the plurality of turbines of the wind farm from the power demand or power generation forecast P(t).

4. The method of claim 2, comprising
determining the sequence of optimum turbine control input values ($u_1^*(t_1) \ldots u_1^*(t_{N1})$) at least once per hour.

5. The method of claim 2, wherein the wind turbines of the wind farm are electrically connected to a collector grid, comprising
providing an objective function including a term penalizing power flow imbalance in the collector grid.

6. The method of claim 2, wherein the objective function includes a term indicative of earnings from electrical power generated by the first turbine over a time span including the component maintenance time $t_M$.

7. The method of claim 1, comprising
providing for each of the sequence of time intervals ($t_1 \ldots t_{Nj}$) into the future a wind forecast, and calculating a sequence of electrical power output values ($p_j(t_1) \ldots p_j(t_{Nj})$) of each of the plurality of turbines of the wind farm based on the wind forecast and based on a respective sequence of turbine control input values ($u_j(t_1) \ldots u_j(t_{Nj})$),
providing for each of the sequence of time intervals ($t_1 \ldots t_{Nj}$) into the future an electrical power demand or power generation forecast P(t) for the wind farm, and
providing an objective function J penalizing a deviation of a sum of the calculated electrical power outputs $p_j(t)$ of the plurality of turbines of the wind farm from the power demand or power generation forecast P(t).

8. The method of claim 7, comprising
determining the sequence of optimum turbine control input values ($u_1^*(t_1) \ldots u_1^*(t_{N1})$) at least once per hour.

9. The method of claim 7, wherein the wind turbines of the wind farm are electrically connected to a collector grid, comprising
providing an objective function including a term penalizing power flow imbalance in the collector grid.

10. The method of claim 7, wherein the objective function includes a term indicative of earnings from electrical power generated by the first turbine over a time span including the component maintenance time $t_M$.

11. The method of claim 1, comprising
determining the sequence of optimum turbine control input values ($u_1^*(t_1) \ldots u_1^*(t_{N1})$) at least once per hour.

12. The method of claim 11, wherein the wind turbines of the wind farm are electrically connected to a collector grid, comprising
providing an objective function including a term penalizing power flow imbalance in the collector grid.

13. The method of claim 11, wherein the objective function includes a term indicative of earnings from electrical power generated by the first turbine over a time span including the component maintenance time $t_M$.

14. The method of claim 1, wherein the wind turbines of the wind farm are electrically connected to a collector grid, comprising
providing an objective function including a term penalizing power flow imbalance in the collector grid.

15. The method of claim 14, wherein the objective function includes a term indicative of earnings from electrical power generated by the first turbine over a time span including the component maintenance time $t_M$.

16. The method of claim 1, wherein the objective function includes a term indicative of earnings from electrical power generated by the first turbine over a time span including the component maintenance time $t_M$.

17. A wind farm management system for operating a wind farm including a plurality of wind turbines with a plurality of turbine components comprising a first and further turbine components, said plurality of turbine components subject to degradation, comprising: a processor; memory in electronic communication with the processor; and instruction stored in the memory, the instructions being executable by the processor to:
predict a component life index L(t) of a turbine component of a first wind turbine, for each of a sequence of time intervals ($t_1 \ldots t_N$) into the future, based on a model of the first wind turbine and based on a sequence of first turbine control input values ($u_1^*(t_1) \ldots u_1^*(t_N)$) including a component maintenance action at a maintenance interval $t_M$,
determine a sequence of optimum turbine control input values ($u_1^*(t_1) \ldots u_1^*(t_N)$) including
a) an optimum maintenance interval $t_M^*$ for the first turbine component and
b) optimum maintenance intervals $t_{Mj}^*$ for each of the further turbine components that optimize an objective function J(u) depending on the component life index L of the first turbine component and on component life indices $L_j$ of the further turbine components, and
operate the first wind turbine according to at least one optimum turbine control input value $u_1^*(t_1)$,
predict the component life index of the component based on a sequence of second turbine control input values ($u_2(t_1) \ldots u_2(t_{N2})$) of a second wind turbine electrically connected to a same branch of a collector grid of the wind farm as the first wind turbine, by evaluating voltage phase and amplitude difference between the first turbine and the second turbine, and
determine optimum first and second turbine control input values $u_1^*(t)$, $u_2^*(t)$.

\* \* \* \* \*